United States Patent
Suzuki et al.

(10) Patent No.: US 10,008,717 B2
(45) Date of Patent: Jun. 26, 2018

(54) ANODE FOR LITHIUM BATTERIES, LITHIUM BATTERY AND METHOD FOR PREPARING ANODE FOR LITHIUM BATTERIES

(71) Applicant: Zeptor Corporation, Menlo Park, CA (US)

(72) Inventors: Tatsunori Suzuki, Menlo Park, CA (US); Yuki Matsuoka, Menlo Park, CA (US); Zhihui Wang, Menlo Park, CA (US)

(73) Assignee: ZEPTOR CORPORATION, Menlo Park, CA (US)

( * ) Notice: Subject to any disclaimer, the term of this patent is extended or adjusted under 35 U.S.C. 154(b) by 145 days.

(21) Appl. No.: 14/693,177

(22) Filed: Apr. 22, 2015

(65) Prior Publication Data
US 2016/0315313 A1 Oct. 27, 2016

(51) Int. Cl.
| | |
|---|---|
| *H01M 4/58* | (2010.01) |
| *H01M 4/36* | (2006.01) |
| *C25D 5/10* | (2006.01) |
| *H01M 4/133* | (2010.01) |
| *H01M 4/134* | (2010.01) |
| *H01M 4/587* | (2010.01) |
| *H01M 4/38* | (2006.01) |

(Continued)

(52) U.S. Cl.
CPC .............. *H01M 4/366* (2013.01); *C25D 5/10* (2013.01); *C25D 7/00* (2013.01); *C25D 15/00* (2013.01); *H01M 4/0438* (2013.01); *H01M 4/133* (2013.01); *H01M 4/134* (2013.01); *H01M 4/382* (2013.01); *H01M 4/587* (2013.01); *C25D 3/38* (2013.01); *C25D 3/665* (2013.01); *H01M 10/0525* (2013.01); *H01M 2004/021* (2013.01); *H01M 2004/027* (2013.01)

(58) Field of Classification Search
CPC ...... H01M 4/366; H01M 4/362; H01M 4/133; H01M 4/134; H01M 4/382; H01M 4/587; H01M 4/0438; H01M 4/139; H01M 10/052; H01M 10/0525; H01M 2004/027; C25D 5/10; C25D 15/00
See application file for complete search history.

(56) References Cited

U.S. PATENT DOCUMENTS

| | | |
|---|---|---|
| 5,556,721 A | 9/1996 | Sasaki et al. |
| 2012/0121986 A1 | 5/2012 | Balu et al. |
| 2015/0311525 A1* | 10/2015 | Masarapu ............. H01M 4/485 429/217 |

FOREIGN PATENT DOCUMENTS

| | | |
|---|---|---|
| JP | H07-29602 | 1/1995 |
| JP | 2012-532435 | 12/2012 |

* cited by examiner

*Primary Examiner* — Raymond Alejandro
(74) *Attorney, Agent, or Firm* — Knobbe, Martens, Olson & Bear, LLP

(57) ABSTRACT

In forming an anode by using metallic lithium as the anode active material, the present invention provides an anode for lithium batteries which can be produced with high productivity and in which dendrite generation is prevented, so that high safety can he secured. An anode for lithium batteries according to an embodiment of the present invention comprises a structure comprising a conductive material layer in which carbon nanotubes are anchored, with a part of the carbon nanotube extending from at least one face of the surfaces of the conductive material layer, and a deposited layer formed by depositing metallic lithium on the carbon nanotubes in the structure.

6 Claims, 7 Drawing Sheets

(51) Int. Cl.
  *C25D 15/00* (2006.01)
  *C25D 7/00* (2006.01)
  *H01M 4/04* (2006.01)
  *H01M 10/0525* (2010.01)
  *H01M 4/02* (2006.01)
  *C25D 3/66* (2006.01)
  *C25D 3/38* (2006.01)

Charging

ANODE FOR LITHIUM BATTERIES, LITHIUM BATTERY AND METHOD FOR PREPARING ANODE FOR LITHIUM BATTERIES

BACKGROUND OF THE INVENTION

Field of the Invention

The present invention relates to an anode for lithium batteries, a lithium battery comprising the anode and method for preparing an anode for lithium batteries.

Related Art

Recently, lithium batteries have high battery voltage and high energy density and use of lithium batteries is growing as a device to store or generate electric energy or as a main power supply for portable electronics, electric cars, and mobile communication apparatuses, etc.

A lithium battery is basically constituted by a cathode, an anode, an electrolyte and a separator, and is used as a primary battery or a secondary battery. For example, in a lithium secondary battery, lithium ions move from a cathode to an anode during charging, whereby it is possible to store an electrical charge, while lithium ions move in the opposite direction during discharging.

As an anode active material in a lithium battery, carbon materials such as graphite with which intercalation and release of lithium ions are possible are widely used practically, because carbon materials exhibit relatively high capacity and a good cycling characteristics. However, since downsizing and long time use are demanded for electronic devices recently, anode active materials are required to have higher capacity.

In such situations, as anode active materials for batteries, those comprising metallic lithium have been gathering attention. For instance, when metallic lithium is independently used as an anode active material, since an electrode potential is the lowest, an output potential of a battery combined with a cathode in which a common cathode active material is used becomes very large and, further, energy densities are also high, which is preferable (for instance refer to Patent Document 1). Therefore, a metallic foil of lithium is actually beginning to be used as an anode in lithium primary batteries.

However, in forming an anode by using a metallic foil of lithium, it is necessary to produce a metallic foil of several microns thick. It is difficult to produce such a metallic foil stably and inexpensively, and therefore productivity is poor, resulting in insufficient spread of practical applications.

In place of such metallic lithium foil, research has been undertaken with respect to a method wherein an anode is formed by depositing metallic lithium on an anode current collector by applying charge in a solution containing lithium ions. However, since the current density which can be applied in order to deposit metallic lithium on an anode current collector with a predetermined area has a limit, it naturally takes a long treatment time to deposit a required amount of lithium on a current collector so that metallic lithium functions as an anode. Therefore efficient production becomes difficult.

Further, in particular, in lithium ion secondary batteries, during charging and discharging, a defect which generates on the surface of metallic lithium sometimes acts as a core and results in the generation of thorn-like lithium called dendrite. Dendrite may sometimes grow in a way so as to penetrate the separator, which separates the cathode from the anode, causing fire, etc.

Here, Patent Document 2 discloses techniques relating to novel structures wherein carbon nanotubes that extend from a conductive composite material are anchored, as a structure for application as a current conductor and fully or part of an electrode for electrochemical power devices such as a conductive battery, supercapacitor, fuel cell, or the like. Further, Patent Document 2 discloses examples where the structure is applied as an electrode of, for instance, a lithium battery and indicates that the carbon nanotubes in the structure may comprise nanoparticles or silicon.

However, Patent Document 2 does not disclose lithium batteries in which metallic lithium is used as an anode active material or an idea of efficiently producing batteries which use metallic lithium as an anode material or an idea of suppressing the generation of dendrite during charging and discharging.

Patent Document 1: Japanese Unexamined Patent Application, Publication No. H07-29602

Patent Document 2: Japanese Unexamined Patent Application (Translation of PCT Application), Publication No. 2012-532435

SUMMARY OF THE INVENTION

The present invention was made in consideration of such a situation. In forming an anode by using metallic lithium as the anode active material, the present invention aims to provide an anode for lithium batteries which can be produced with high productivity and in which generation of dendrites is prevented, so that high safety can be secured; and a lithium battery comprising the same.

The present inventors conducted intensive research to find that the aforementioned problem can be solved by forming an anode by adopting as an anode current collector a conductive material layer having a three-dimensional surface structure from the surface of which carbon nanotubes extend (or project); and depositing metallic lithium as the anode active material on the carbon nanotubes extending from the surface so as to form an anode. In other words, the present invention provides the following.

(1) The first invention of the present invention is an anode for lithium batteries comprising: a structure comprising a conductive material layer in which carbon nanotubes are anchored, with a part of each of the carbon nanotubes extending from at least one face of the surfaces of the conductive material layer; and a deposited layer formed by depositing metallic lithium on the carbon nanotubes in the structure.

(2) The second invention of the present invention is the anode for lithium batteries of the first invention, wherein the density of the carbon nanotubes extending from the surface of the conductive material layer is 0.1 to 10 mg/cm$^2$.

(3) The third invention of the present invention is the anode for lithium batteries of the first invention, wherein the deposited amount of the metallic lithium in the deposited layer is 0.01 to 5 mg/cm$^2$.

(4) The fourth invention of the present invention is the anode for lithium batteries of the first invention, wherein the carbon nanotubes comprise carbon nanofibers.

(5) The fifth invention of the present invention is the anodes for lithium batteries of the first invention, wherein the lithium batteries are secondary batteries.

(6) The sixth invention of the present invention is a lithium battery comprising an anode comprising: a structure comprising a conductive material layer in which carbon nanotubes are anchored, with a part of each of the carbon nanotubes extending from at least one face of the surfaces of the conductive material layer; and a deposited layer formed by depositing metallic lithium on the carbon nanotubes in the structure.

(7) The seventh invention of the present invention is a method for producing an anode for lithium batteries, comprising: a step of passing a substrate through an electroplating bath comprising conductive metal or alloy and carbon nanotubes to form a conductive material layer comprising the carbon nanotubes by electroplating; and a step of forming a deposited layer by depositing metallic lithium on the carbon nanotubes by electroplating using a lithium electrode, wherein the carbon nanotubes are anchored in the conductive material layer and, additionally, a part of each of the carbon nanotubes extends from the surface of the conductive material layer; and a deposited layer of the metallic lithium is formed on the carbon nanotubes extending from the surface of the conductive material layer.

According to the present invention, it is possible to produce anodes for lithium batteries with high productivity. Further, it is possible to secure high safety by preventing the generation of dendrite.

DETAILED DESCRIPTION OF THE INVENTION

Figure 1:
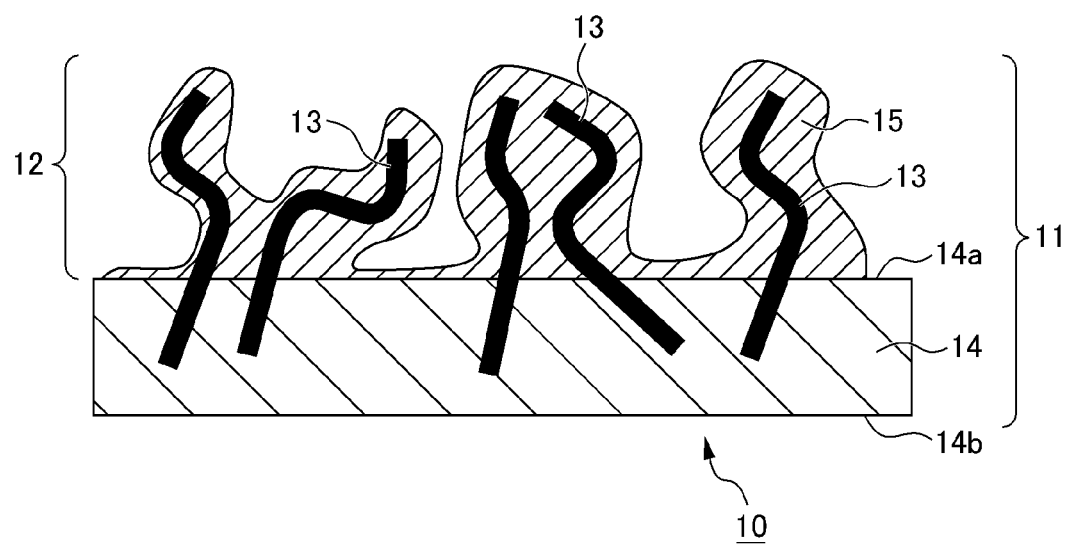
FIG. 1 is a schematic drawing showing a constitution of a cross-section of an anode for lithium batteries.

Below, the specific embodiments of the present invention will be explained in detail, referring to the drawings. Incidentally, the present invention is not limited to the embodiments described below, but various modifications are possible as long as the intention of the present invention is not changed.

1. Anode for Lithium Batteries

FIG. 1 is a drawing which schematically shows a constitution of an anode for lithium batteries according to the present invention (hereinafter, referred to simply as "anode"). As shown in FIG. 1, anode for lithium batteries 10 comprises structure 11 whose surface is not flat and smooth, but forms a three dimensional surface structure, and deposited layer 12 of anode active material, which is formed on the structure 11.

1-1. Constitution of Anode for Lithium Batteries

[Structure]

The structure 11 comprises carbon nanotubes (CNT) 13 and conductive material layer 14 in which at least a part of each of the carbon nanotubes 13 is anchored by embedding. The structure 11 functions as an anode current collector.

Figure 2:
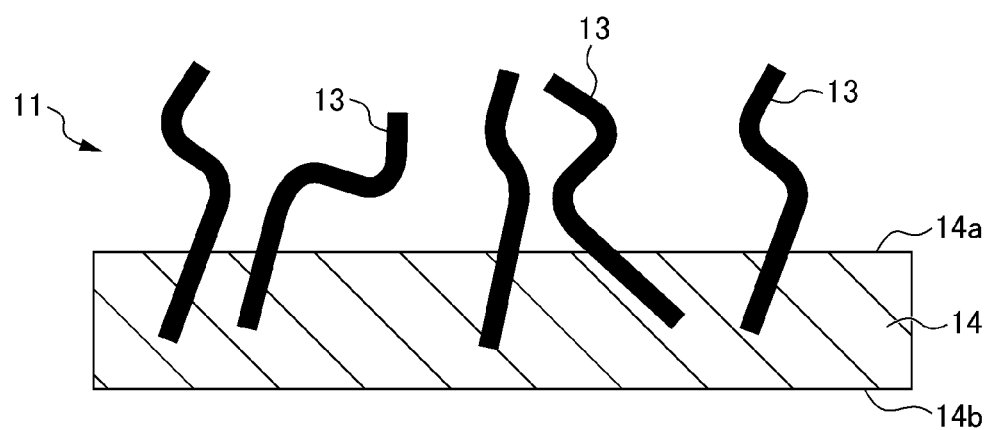
FIG. 2 is a cross-sectional drawing schematically showing only a structure which is an anode current collector which constitutes the anode for lithium batteries.

FIG. 2 is a cross-sectional view which schematically shows only the structure 11 constituting anode for lithium battery 10, namely, a drawing which shows an example of an embodiment of this structure 11. As shown in FIG. 2, the structure 11 comprises the conductive material layer 14, in which at least a part of each of the carbon nanotubes 13 are embedded and anchored. Further, the anchored carbon nanotubes 13 extend (or project) from surface 14a of the conductive material layer 14.

The example shown in FIG. 2 shows an embodiment, wherein one end of each of the carbon nanotubes 13 is completely covered with the conductive material layer 14, and the other end of each of the carbon nanotubes 13 projects from the surface 14a of the conductive material layer 14. Further, in another embodiment, nearly a center part of the carbon nanotube 13 is embedded in the conductive material layer 14 and both ends of each of the carbon nanotubes 13 may project from the surface 14a (a first face) and from the back face 14b (a second face) of the conductive material layer 14.

The carbon nanotube 13 is carbon material which has a shape formed by cylindrically spooled graphite, with its diameter, for instance, being about several nanometers to 100 nm, and its length being about several nanometers to 1 mm. The carbon nanotube 13 may be in a single-layer structure or a multi-layer structure. The carbon nanotube 13 comprises carbon nanofiber with its fiber diameter being around 100 nm to 1 μm. The anode for lithium batteries 10 according to the present invention is constituted so that a part of each of the carbon nanotubes 13 is embedded in the inside of the conductive material layer 14 and additionally the carbon nanotubes 13 project at least from the surface 14a of the conductive material layer 14.

Further, the conductive material layer 14 is constituted by, for instance, conductive metal and metal alloy, etc. Specifically, the conductive material layer 14 is constituted by conductive metals such as copper, nickel, zinc, aluminum, gold, and silver, or metal alloys including these metals or other metals. Also, various kinds of materials such as conductive polymers may be included. In the anode for lithium batteries 10 according to the present invention, the conductive material layer 14 embeds a part of each of the carbon nanotubes 13 to anchor and substantially functions as an anode current collector on which anode active material including metallic lithium 15 is deposited.

As stated above, in the structure 11, the carbon nanotubes 13 are embedded in the conductive material layer 14 and anchored and additionally, the carbon nanotubes 13 project from at least the surface 14a of the conductive material layer 14 and extend, whereby the surface 14a of the conductive material layer 14 forms a three-dimensional surface structure, and not a flat and smooth surface. Therefore, the surface 14a of the conductive material layer 14 has a larger surface area compared to a state where the surface is flat and smooth. In the anode for lithium batteries 10 according to the present invention, the conductive material layer 14 having the surface 14a from which the carbon nanotubes 13 project is constituted as an anode current collector and on the conductive material layer 14 with its surface area being large, metallic lithium 15 which is an anode active material is deposited.

Here, the density of the carbon nanotubes 13 per unit area on the surface 14$a$ of the conductive material layer 14 is not particularly limited, but a density of approximately 0.1 to 10 mg/cm$^2$ is preferable. When the density of the carbon nanotubes 13 is less than 0.1 mg/cm$^2$, the amount of the carbon nanotubes 13 projecting from the surface 14$a$ of the conductive material layer 14 is small and therefore, a sufficiently large surface area is not attained. Contrary to this, when the density is higher than 10 mg/cm$^2$, the surface of the deposited layer 12 deposited on the carbon nanotubes 13 projecting from the surface 14$a$ of the conductive material layer 14 becomes close to a flat and smooth state, so that growth of dendrite may not be prevented effectively.

As an embodiment of the carbon nanotubes 13 projecting from the surface 14$a$ of the conductive material layer 14, the carbon nanotubes 13 may extend approximately perpendicular or obliquely from the surface 14$a$ and further adjacent carbon nanotubes 13 may extend being entangled with each other. Furthermore, the carbon nanotubes 13 may extend not only in a regularly spaced manner but also in a randomly spaced manner, on the surface 14$a$ of the conductive material layer 14.

[Deposited Layer]

The deposited layer 12 is a layer formed by the deposition of an anode active material on the structure 11. In the anode for lithium batteries 10, metallic lithium 15 is used as the anode active material and the deposited layer 12 is a layer formed by deposition of the metallic lithium 15.

As shown in FIG. 1, in the anode for lithium batteries 10 according to the present invention, the metallic lithium 15 is deposited on the carbon nanotubes 13 projecting from the surface 14$a$ of the conductive material layer 14 to form the deposited layer 12. Further, the deposited layer 12 is also formed on the surface 14$a$ of the conductive material layer 14. As described above, since the deposited layer 12 of metallic lithium 15 is formed on the surface 14$a$ of the conductive material layer 14 where the carbon nanotubes 13 project, so that a three dimensional structure is formed, the surface of the deposited layer 12, i.e., the surface of the metallic lithium 15 which has been deposited, is not a flat and smooth face, but is a face having a three-dimensional surface structure.

The deposited amount of the metallic lithium 15 in the deposited layer 12 is not particularly limited, but preferably approximately 0.01 to 5 mg/cm$^2$. When the deposited amount of the metallic lithium 15 is less than 0.01 mg/cm$^2$, total amount of the metallic lithium resulting from solution deposition reaction by charging and discharging decreases and thereby, battery characteristics may be lowered. Contrary to this, when the deposited amount of the metallic lithium 15 exceed 5 mg/cm$^2$, it takes time to deposit the metallic lithium, resulting in lower productivity, as well as the surface of the deposited layer 12 becoming closer to a flat and smooth state, so that growth of dendrite may not be prevented effectively.

Any deposited layer 12 of the metallic lithium 15 is acceptable as long as the metallic lithium 15 is deposited in a certain thickness. A state wherein the metallic lithium is deposited over the carbon nanotubes 13 or all over the surface 14$a$ of the conductive material layer 14 is preferred. The state of deposition of the deposited layer 12 can be changed within in a scope where battery characteristics are not affected. Even a state of partial deposition is permissible.

1-2. Working Effects of Anode for Lithium Batteries

Figure 3:
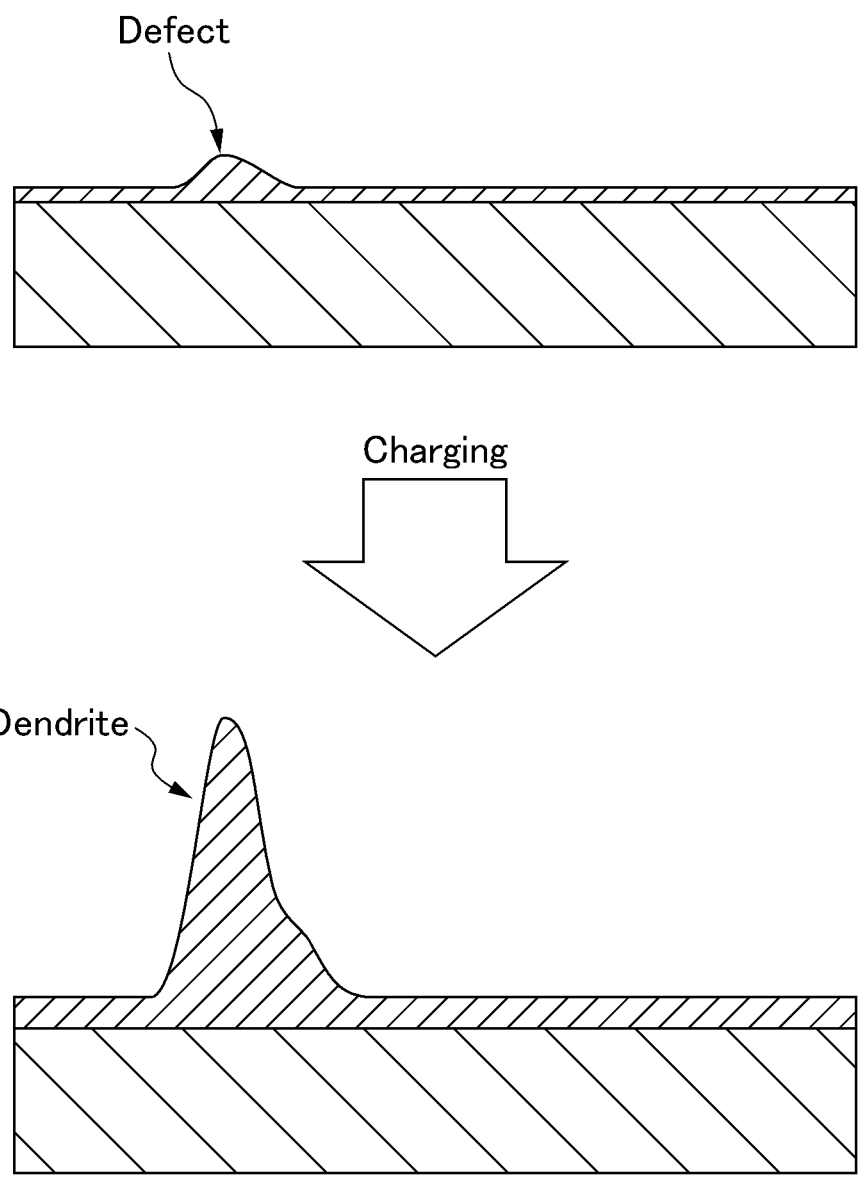
FIG. 3 is a schematic drawing showing a mechanism of dendrite growth in a conventional anode.

Meanwhile, in conventional lithium batteries, an anode was constituted by laminating metallic foil of lithium or depositing metallic lithium on a flat and smooth surface of an anode current collector. However, when such an anode is used as an anode of a lithium ion secondary battery, there occurs a problem that if, for instance, a defect generates on the flat and smooth surface, thorn-like lithium structures called dendrites grow around the defect acting as a core during charging and discharging (refer to the schematic drawing showing a mechanism of dendrite growth, for instance, in FIG. 3). Such dendrites result in fire by penetrating the separator constituting the secondary battery.

Further, when metallic lithium is used as an anode active material, the deposited metallic lithium functions as an anode through solution-deposition reaction of the deposited metallic lithium, not through insertion and release of lithium, as is the case where carbon material such as graphite is used as an anode active material. Therefore, in order to make the deposited metallic lithium function as an anode effectively, it is necessary to deposit a predetermined amount of metallic lithium on an anode current collector. However, in depositing metallic lithium on an anode current collector by applying current in a solution comprising lithium ions, an amount of applicable current is limited to a certain level, and therefore, it takes a long time to deposit a predetermined amount of metallic lithium which is necessary to function as an anode without any fault, resulting in productivity issues.

Contrary to this, in the anode for lithium batteries 10 according to the present invention, the deposited layer 12 of the metallic lithium 15 is formed on the carbon nanotubes 13 projecting from the surface 14$a$ of the conductive material layer 14. In other words, the metallic lithium 15 is not formed on a flat and smooth surface of an anode current collector as in the conventional method, but on the carbon nanotubes 13 forming a three-dimensional surface structure. Thereby, the surface of the deposited metallic lithium 15 also does not become a flat and smooth surface, but becomes a face having a three-dimensional surface structure.

Figure 4:
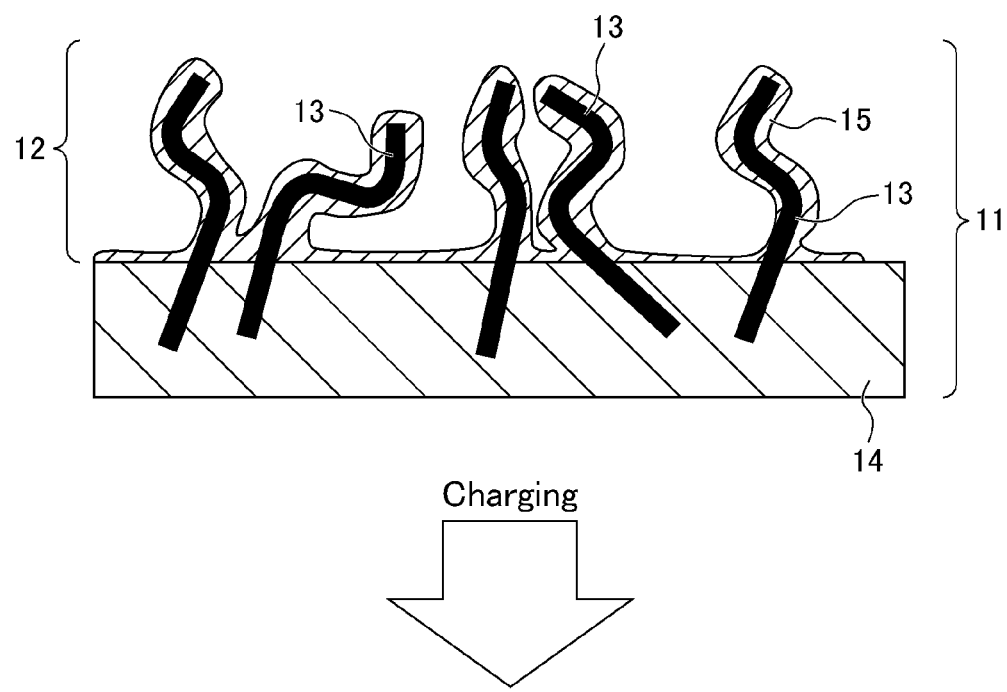
FIG. 4 is a schematic drawing showing a mechanism of dendrite growth in the anode according to the present invention.
Figure 4:
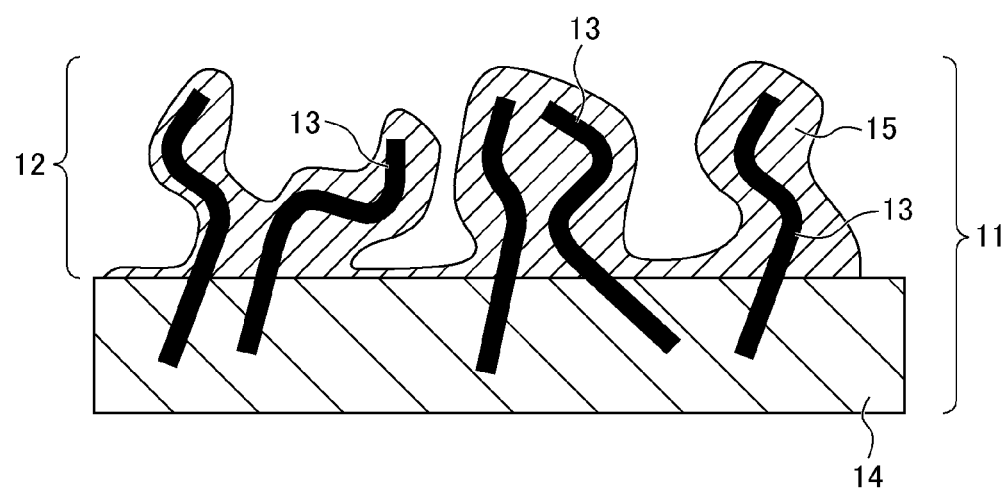

When such an anode for lithium batteries 10 is used as an anode of secondary batteries, the surface of the deposited metallic lithium 15 also becomes a three-dimensional structure, whereby dispersibility of electrical charge during charging and discharging improves and, hence, generation of dendrite can be prevented. More specifically, while in the anode for lithium batteries 10 according to the present invention, the surface of the metallic lithium 15 has a three-dimensional structure due to the carbon nanotubes 13, whereby projections which constitute the three-dimensional structure act like so-called defects, myriad of projections exist and therefore the applied current is dispersed by the myriad of projections, whereby the growth into dendrite, which is caused by convergence of current, can be prevented (refer to the schematic drawing, for instance, shown in FIG. 4).

Further, the surface area of the surface 14$a$ can be increased effectively, by fabricating the surface 14$a$ of the conductive material layer 14 into a three-dimensional structure wherein the carbon nanotubes 13 project. In the surface 14$a$ of the conductive material layer 14 having such a large surface area, current flowing per unit area decreases. Therefore, it becomes possible for a larger amount of current to flow to the surface 14$a$ of the conductive material layer 14 having a large surface area, compared to a flat and smooth face. Thereby, in depositing metallic lithium by electrolysis on the carbon nanotubes 13 projecting from the surface 14$a$ of the conductive material layer 14, it becomes possible to increase the amount of current to be applied, whereby it becomes possible to considerably shorten the treatment time required to deposit a desired amount of the metallic lithium 15 compared to the treatment time in the conventional method for preparing an anode, resulting in improved productivity.

2. Method of Preparing Anode for Lithium Batteries

Next, a method of preparing the anode for lithium batteries 10 according to the present invention will be explained. The method for producing this anode for lithium batteries 10 comprises: a step of forming structure 11 which is an anode current collector and comprises carbon nanotubes 13 and a conductive material layer 14 in which at least a part of each of the carbon nanotubes 13 is embedded and anchored (structure-forming step); and a step of forming a deposited layer 12 by depositing metallic lithium 15 on the carbon nanotubes 13 in the structure 11 (deposited layer-forming step). Below, each of the steps will be explained.

2-1. Structure-forming Step

Firstly, in the structure-forming step, the structure 11 comprising the carbon nanotubes 13 and the conductive material layer 14 in which at least a part of each of the carbon nanotubes 13 is embedded and anchored is formed (refer to the schematic drawing of FIG. 2).

The method of forming the structure 11 is not particularly limited, but the following method can be exemplified, wherein a substrate (a supporting substrate) made of, for instance, metallic foil is passed through an electroplating solution comprising ions of conductive metal or alloy to apply electroplating treatment, whereby the conductive material layer 14 which is an electroplating film is formed on the substrate.

Figure 5:
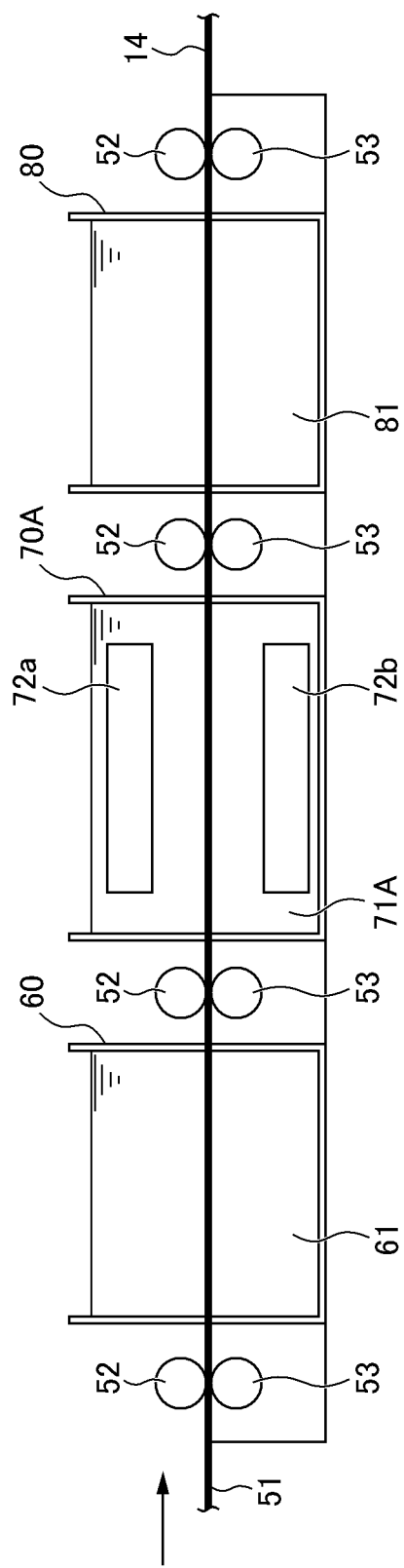
FIG. 5 is a schematic drawing for explaining an example of treatment wherein a structure is formed by laminating a conductive material layer on a substrate by electroplating treatment.

Here, FIG. 5 is a schematic drawing to outline the treatment to form the structure 11 by laminating the conductive material layer 14 on a substrate by electroplating treatment. As shown in FIG. 5, the structure 11 can be formed in a roll-to-roll process wherein a metal substrate made of metallic foil 51, etc. (metal substrate film) is passed through a treating tank containing an electroplating solution while being conveyed in a horizontal direction with conveying rollers to apply the electroplating treatment.

As the metal substrate film 51, a film having a thickness of 5 μm to 5 mm and comprising metal such as copper, nickel, aluminum, zinc, aluminum, silver, stainless steel, etc. or alloy can be used. For instance, the structure 11 is formed by laminating the conductive material layer 14 on the metal substrate film 51 in the form of sheet which has been spooled in the form of a roll, by means of roll-to-roll.

More specifically, the treatment apparatus shown in the schematic drawing of FIG. 5 comprises a pre-treatment tank 60, an electroplating treatment tank 70A and a post-treatment tank 80. Symbol 52 indicates a cathode power supply roller and symbol 53 indicates a nip roller. The metal substrate film 51 made of metallic foil, etc. is conveyed in the horizontal direction and passed through each of the treatment tanks, so that treatments are applied.

The pre-treatment tank 60 is a tank for performing pre-treatment prior to electroplating treatment, such as degreasing treatment for the metal substrate 51 or acid washing treatment, etc. and the tank contains chemical solution for performing degreasing treatment or acid washing treatment, etc. (pre-treatment solution 61). The post-treatment tank 80 is a treatment tank for providing post-treatment such as anticorrosive treatment, etc. to the conductive material layer 14 formed on the metal substrate film 51 by electroplating treatment and the tank contains chemical solution for performing anticorrosive treatment, etc. (post-treatment solution 81).

In the electroplating treatment tank 70A containing an electroplating solution 71A, current is supplied to anodes 72a and 72b provided in the upper part and the lower part of the treatment tank 70A, so that electroplating treatment is applied to the metal substrate film 51 which is conveyed in the horizontal direction. Thereby, the conductive material layer 14 is formed on the metal substrate film 51, which is an electroplating film.

This time, according to the embodiment of the present invention, as the electroplating solution 71A, a solution which contains metal ions for constituting the conductive material layer 14 and in which solution the carbon nanotubes 13 are dispersed is used. Thereby, it is possible to form the conductive material layer 14 containing the carbon nanotubes 13 on a substrate by electroplating treatment.

As a basic composition of the electroplating solution 71A, for instance, a copper electrolyte solution comprising copper sulfate ($CuSO_4$) with a concentration of approximately 0.1 to 10 mol/L and sulfuric acid ($H_2SO_4$) with a concentration of approximately 2 to 4 mol/L can be used. Further, the content of the carbon nanotubes 13 in the electroplating solution 71A can be, for instance, approximately 1 mass % to 50 mass %. Incidentally, the composition of the electroplating solution 71A is not limited thereto, but electroplating solutions with various concentrations or compositions can be used, depending upon the desired conductive material layer 14 and characteristics thereof, characteristics of the carbon nanotubes 13, and thicknesses of the conductive material layer 14, and the like. Furthermore, as required, various additives such as chloride ions, polyethers, and surfactants, etc. may be contained. Incidentally, other examples of electroplating solutions are disclosed in U.S. Pat. No. 7,651,766 and US Unexamined Patent Application, Publication No. 2010/0122910.

The other treatment conditions of electroplating treatment are not particularly limited, and, for instance, the treatment is preferably conducted with a current density of approximately 0.1 to 8 $A/dm^2$ while stirring the electroplating solution 71A with an electromagnet stirrer, etc. at a stirring speed of approximately 60 rpm. Further, the temperature of the electroplating solution 52 may be set to approximately 25° C.

In electroplating treatment, current is supplied to both anodes 72a and 72b and thereby plating treatment is applied to both faces of the metal substrate film 51 to form the conductive material layer 14. Furthermore, in the case the conductive material layer 14 is formed on only one face of the metal substrate film 51, current may be applied to either one of the anode 72a or 72b.

Incidentally, it is possible to provide a water washing treatment tank to apply water washing treatment or a roller or an air nozzle, etc. for draining off liquid between each of the treatment tanks 60, 70A and 80. Further, it is possible to provide a drying treatment tank to apply drying treatment posterior to the post-treatment tank 80.

Figure 6A:
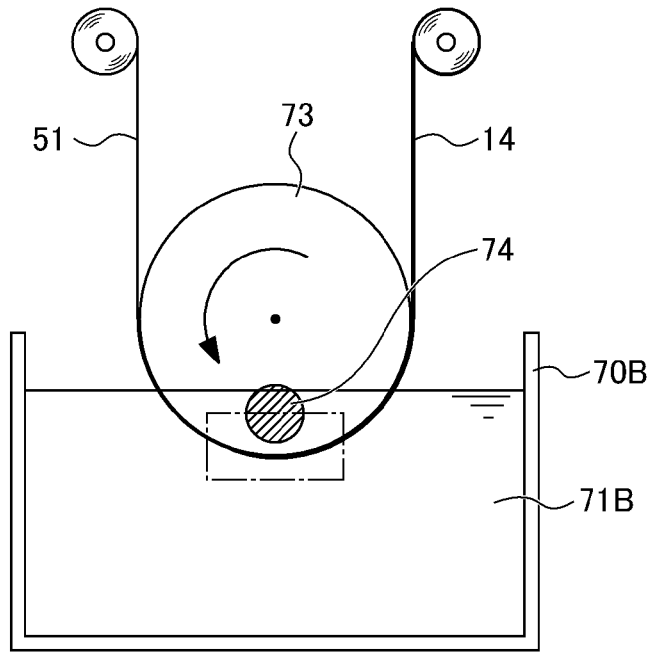
FIG. 6A is a schematic drawing for explaining another example of treatment wherein a structure is formed by laminating a conductive material layer on a substrate by electroplating treatment.
Figure 6B:
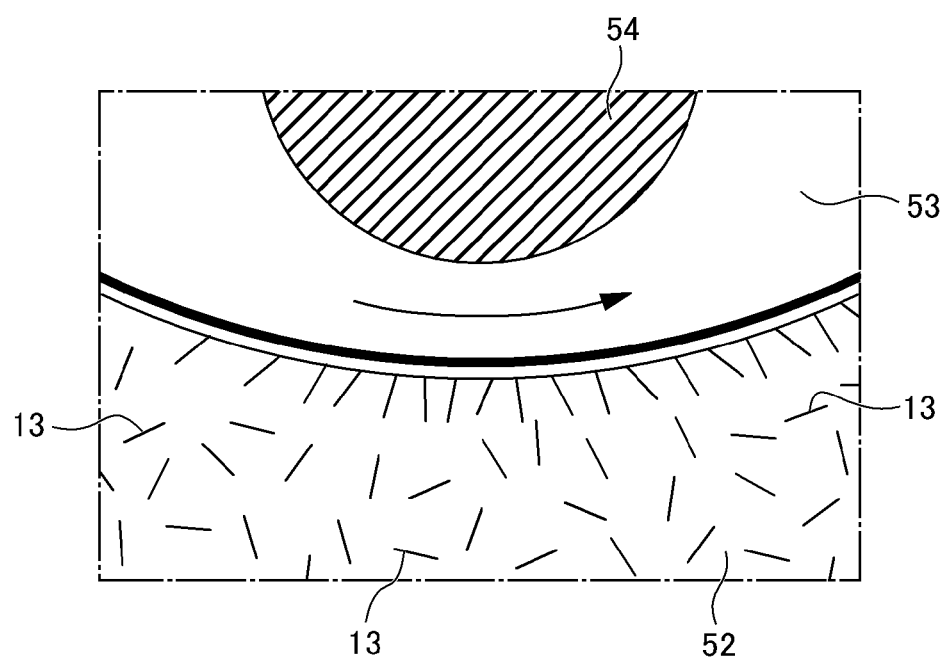
FIG. 6B is an enlarged drawing of the zone enclosed by broken lines in FIG. 6A.

Further, as another method for forming the structure 11, a method may be used, wherein electroplating treatment is applied by passing sheet-like metal substrate film 51, which has been spooled into a roll, around a drum 73 which is partly dipped in the electroplating solution 71B contained in the electroplating treatment tank 70B, for instance, as shown in FIGS. 6A and 6B. In such electroplating treatment, the conductive material layer 14 which is an electroplating film is also formed on the metal substrate film 51, using an electroplating solution in which carbon nanotubes 13 are dispersed, as the electroplating solution 71B.

Incidentally, in order to ensure that the carbon nanotubes 13 dispersed in the electroplating solution 71B extend effectively from the surface 14a of the conductive material layer 14 formed on the metal substrate film 51, during the electroplating treatment, a magnet 74 may be inserted into the drum 73 to apply an electric field so that the carbon nanotubes 13 in the electroplating solution 71B are attracted by the metal substrate film 51. FIG. 6B is an enlarged drawing of the zone enclosed by broken lines in FIG. 6A.

After applying electroplating treatment as described above, the structure 11 in which the conductive material layer 14 from the surface 14a of which the carbon nanotubes 13 extend is cut into desired sizes. The size into which the structure 11 is to be cut is not particularly limited, but it is possible to cut the structure into the size of approximately 1 mm² to 1 m². Incidentally, before being cut into a desired size, the metal substrate film 51 may be peeled off from the formed conductive material layer 14.

Incidentally, in the preparation examples described above, explanation is given regarding the embodiment wherein the conductive material layer 14 in which the carbon nanotubes 13 are anchored is formed on the metal substrate 51 so as to prepare the structure 11, but the producing method is not limited thereto and the conductive material layer 14 may be formed by electroplating treatment in which a metal substrate is not used.

2-2. Deposited Layer-Forming Process

Next, in the deposited layer forming process, the deposited layer 12 is formed on the structure 11 which has been formed as described above. Specifically, the deposited layer 12 formed of the metallic lithium 15 is formed by depositing the metallic lithium 15 on the carbon nanotubes 13 projecting from the surface 14a of the conductive material layer 14 which constitutes the structure 11.

The method of forming the deposited layer 12 of the metallic lithium 15 is not particularly limited, and for instance, it is possible to form the deposited layer 12 by known liquid phase methods such as electroplating or non-electric plating. In particular, using a method by way of electroplating is preferred. Specifically, when the deposited layer 12 is formed by way of electroplating, the aforementioned structure 11 is dipped in a solution comprising lithium salt and a predetermined current is applied by using a lithium electrode as a counter electrode. Thereby, the metallic lithium 15 is deposited on the carbon nanotubes 13 which constitute the structure 11.

In particular, in the present embodiment, since the carbon nanotubes 13 extend from the surface 14a of the conductive material layer 14 and the metallic lithium 15 is deposited on the structure 11 having a large surface area, it becomes possible to increase the amount of current applied in the electroplating treatment than in the case where metallic lithium is deposited on a flat and smooth face. Thereby, it is possible to shorten the treatment time greatly and, accordingly, produce anode 10 with high productivity.

3. Lithium Battery

The lithium battery according to the present invention is constituted by a cathode comprising cathode active material, an anode comprising anode active material, an electrolytic solution, and a separator separating the cathode and the anode. Further, the lithium battery according to the present invention uses the aforementioned anode for lithium batteries 10 as the anode.

Figure 7:
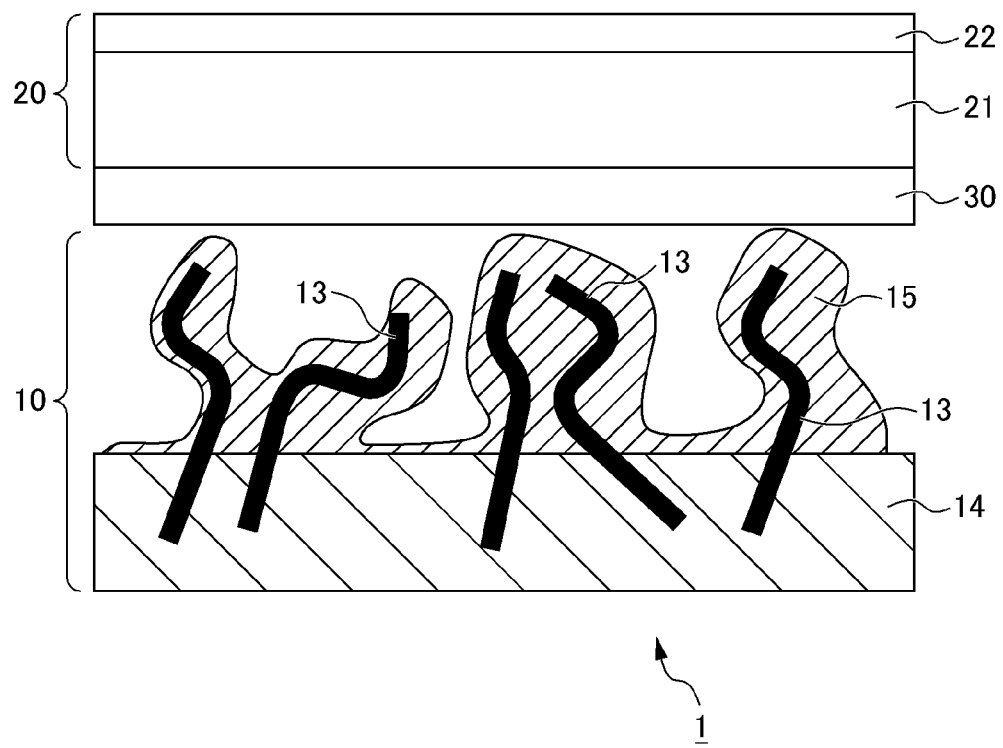
FIG. 7 is a schematic drawing showing a constitution of a cross-section of a lithium battery.

Specifically, FIG. 7 is a schematic drawing showing an example of the constitution of the lithium battery according to the present invention. As shown in FIG. 7, lithium battery 1 is constituted from anode 10, cathode 20 and separator 30.

Further, as the anode 10, this lithium battery 1 uses one comprising: structure 11 comprising conductive material layer 14 wherein carbon nanotubes 13 are anchored, with a part of each of the carbon nanotubes 13 extending from surface 14a of the conductive material layer 14; and deposited layer 12 formed by depositing metallic lithium 15 on the carbon nanotubes 13 in the structure 11.

Incidentally, the lithium battery 1 may be a primary battery or a secondary battery, but from the perspective that generation and growth of dendrite can be effectively prevented during charging and discharging by using the aforementioned anode 10, application as a secondary battery is particularly preferred.

[Cathode]

Cathode 20 comprises cathode electrode layer 21 comprising cathode active material and cathode current collector 22 on which the cathode active material is coated and maintained.

The cathode active material constituting the cathode electrode layer 21 is not particularly limited and any material can be used from materials which can occlude and release lithium ions and have a nobler potential than metallic lithium 15 which is the anode active material. Examples of the anode active material include iron lithium phosphate, manganese lithium phosphate, lithium iron manganese phosphate, lithium cobalt phosphate, lithium cobaltate composite oxide, lithium manganate composite oxide, lithium nickelate composite oxide, lithium niobate composite oxide, lithium ferrate composite oxide, lithium magnesate composite oxide, lithium calciate composite oxide, lithium cuprate composite oxide, lithium zincate composite oxide, lithium molybdate composite oxide, lithium tantalate composite oxide, lithium tungstate composite oxide, lithium-nickel-cobalt-aluminum composite oxide, lithium-nickel-cobalt-manganese composite oxide.

These cathode active materials are mixed with a binder such as PVDF (polyvinylidene fluoride) or PTFE (polytetrafluoroethylene), and to the mixture, a suitable solvent and additional conductive agents such as carbon material or additives such as ionic conductive agents, etc. are added and kneaded, and then, a layer is formed on cathode current collector 22 having conductivity, so as to obtain the cathode electrode layer 21.

Further, the cathode current collector 22 is not particularly limited and conventionally known collectors can be used. For instance, as the cathode current collector 22, a metallic foil or a metallic sheet formed of copper, nickel, stainless steel, aluminum, and titanium and the like or conductive polymer material, etc. may be used.

[Anode]

Anode 10, as described above, comprises: structure 11 comprising conductive material layer 14 wherein carbon nanotubes 13 are anchored, with a part of each of the carbon nanotubes 13 extending from surface 14a of conductive material layer 14; and deposited layer 12 formed by depositing metallic lithium 15 on the carbon nanotubes 13 in the structure 11. As specifically shown in FIG. 7, in this anode 10, the carbon nanotubes 13 extend from the surface 14a of the conductive material layer 14.

In the anode 10, the conductive material layer 14 is substantially constituted as an anode current collector. Further, in the anode 10, the metallic lithium 15 deposited on the structure 11 which is an anode current collector functions as an anode active material.

As described above, in the anode 10, the deposited layer 12 of the metallic lithium 15, which is an anode active material, is formed on the structure 11 comprising the conductive material layer 14 having a surface 14a from which the carbon nanotubes 13 project. Thereby, the surface of the deposited layer 12 of the metallic lithium 15 also comes to have a three-dimensional surface structure, dispersibility of electrical charge during charging and discharging improves, and hence, generation and growth of dendrite can be prevented effectively.

[Separator]

Separator 30 is used to separate the anode 10 and the cathode 20 so as to prevent short circuit between both electrodes. Conventional separators can be used. For instance, as the separator 30, unwoven cloth which is commonly used in secondary batteries and permeable separators made from other porous materials can be used. Further, as the separator 30, solid electrolytes composed of polymer gels impregnated with conventional electrolytic solutions can be used.

[Electrolytic Solution]

An electrolytic solution that comprises lithium ions, and conventionally known electrolytic solutions can be used. This electrolytic solution can be constituted by dissolving an electrolyte in an organic solvent.

As for organic solvents, those conventionally known as electrolytic solutions for lithium batteries can be used and organic solvents are not particularly limited. For example, carbonates, halogenated hydrocarbons, ethers, ketones, nitriles, lactones, oxolane compounds, etc. can be used. It is preferable to use propylene carbonate, ethylene carbonate, 1,2-dimethoxyethane, dimethyl carbonate, diethyl carbonate, ethyl methyl carbonate, vinylene carbonate, etc. and mixtures thereof.

Electrolytes are not particularly limited and examples thereof include inorganic salts or derivatives thereof, such as $LiPF_6$, $LiBF_4$, $LiClO_4$, and $LiAsF_6$; and organic salts or derivatives thereof, such as $LiSO_3CF_3$, $LiC(SO_3CF_3)_3$, $LiN(SO_2CF_3)_2$, $LiN(SO_2C_2F_5)_2$, $LiN(SO_2CF_3)(SO_2C_4F_9)$. The concentrations of electrolytes are also not particularly limited and can be properly determined in light of the type, etc. of electrolytes and organic solvents.

EXAMPLES

Below, the present invention will be explained in more detail presenting the Examples of the present invention, but the present invention is not limited to the Examples shown below.

Preparation of Lithium Battery

Example 1

Using an electrolytic copper plating bath having the following composition, a structure comprising a conductive material layer comprising carbon nanofibers was formed on a copper sheet as a metal substrate.

[Composition of Electrolytic Copper Plating Bath in Example 1]

Copper sulfate ($CuSO_4$): 0.1 to 1 mol/L
Sulfuric acid ($H_2SO_4$): 0.2 to 2 mol/L
Carbon nanofiber: 0.5 to 5 g/L
Nonionic surfactant: 0.1 to 5% by volume
(Plating bath temperature: 25° C.)

Specifically, electroplating treatment was provided by using the electroplating apparatus whose schematic view is outlined in FIG. 5, maintaining the temperature of the plating bath at 25° C., and applying a current of 0.1 to 8 $A/cm^2$ while stirring the solution with a chemical pump. Incidentally, in the electroplating treatment, current was supplied only to the upper anode provided in the electrolytic treatment tank whose schematic view is outlined in FIG. 5, thereby only one face of the conveyed copper sheet was provided with plating treatment so as to form the structure composed of the conductive material layer comprising carbon nanofibers.

By this electroplating treatment, the structure comprising a conductive material layer composed of copper in which a part of each of the carbon nanofibers is contained and anchored and from the surface of which the carbon nanofibers project was formed. Incidentally, the amount of the carbon nanofibers contained in the formed conductive material layer was measured to be 0.02 $mg/cm^2$.

Next, metallic lithium was deposited on the surface of the obtained structure by using a mixture of ethylene carbonate, dimethyl carbonate and diethyl carbonate in a ratio of 1:1:1 as an organic solvent; preparing an electrolytic solution by adding 1 mol/L of lithium hexafluorophosphate ($LiPF_6$) to this solvent mixture; and applying electroplating treatment in this solution by using a lithium electrode as a counter electrode. Incidentally, as conditions for electroplating treatment, a current of 1 $mA/cm^2$ was applied over 1 hour.

By this electroplating treatment, an anode was obtained wherein an anode active material of metallic lithium was deposited on the structure as an anode current collector. Incidentally, the amount of the deposited metallic lithium (deposited amount) was 0.3 $mg/cm^2$. Further, as described above, the surface of the conductive material layer in the structure as an anode current collector had projecting carbon nanofibers and accordingly had a three-dimensional surface structure. Metallic lithium was deposited on that surface having a three-dimensional structure and, accordingly, an increased surface area. Therefore, the surface of the formed metallic lithium was not flat and smooth, but three-dimensional due to carbon nanofibers.

A coin-type battery was produced by laminating on the thus prepared anode electrode, a cathode electrode in which NCA cathode material comprising nickel/cobalt/aluminum composite oxide ($Li_pNi_xCo_yAl_zO_2$) (NCA) was used, through a separator.

Comparative Example 1

Unlike in Example 1, a conductive material layer was formed on a copper sheet as a metal substrate, using an electrolytic copper plating bath which did not comprise carbon nanofibers. Incidentally, the conditions in the electroplating treatment were the same as those in Example 1.

[Composition of Electrolytic Copper Plating in Comparative Example 1]

Copper sulfate ($CuSO_4$): 0.1 to 1 mol/L
Sulfuric acid ($H_2SO_4$): 0.2 to 2 mol/L
Nonionic surfactant: 0.1 to 5% by volume
(Plating bath temperature: 25° C.)

Next, on the surface of the obtained conductive material layer, metallic lithium was deposited by electroplating treatment in the same manner as in Example 1. Namely, metallic lithium was deposited on the flat and smooth face of the conductive material layer formed on the copper sheet. An anode in which the conductive material layer is an anode current collector and on the anode current collector, anode active material of metallic lithium was deposited was obtained by this electroplating treatment. Incidentally, the amount of the deposited metallic lithium (deposited amount) was 0.3 $mg/cm^2$.

A coin-type battery was prepared by laminating on the thus prepared anode electrode, a cathode electrode in which NCA cathode material was used, through a separator.

Evaluation of Rate Characteristics of the Lithium Batteries

Rate characteristics were evaluated by using the prepared coin-type batteries. Specifically, in order to evaluate rate characteristics of the batteries, capacity per unit area (mAg/cm$^2$) when charging was performed at C/10 and discharging was changed to each of C/10, C/5, and C/3, under the conditions of 4.35 V of charging voltage and 3.1 V of discharging voltage was determined.

Figure 8:
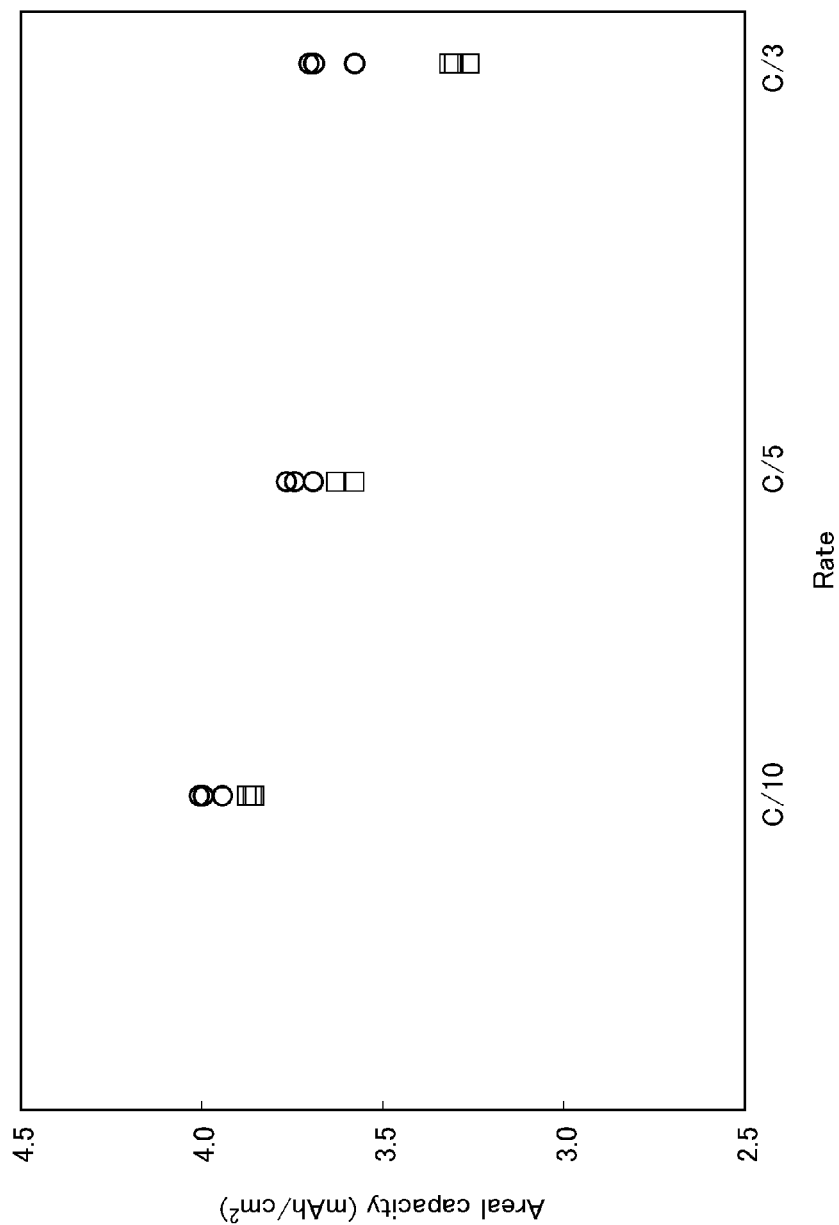
FIG. 8 is a graph showing the results of the rate characteristic tests regarding each of the coin-type battery prepared in Example 1 and that prepared in Comparative Example 1.

FIG. 8 shows the results of the rate characteristics of each of the coin-type battery prepared in Example 1 and that prepared in Comparative Example 1. Further, Table 1 collectively shows the numerical values of the measurement results of the rate characteristics test. Incidentally, three samples of coin-type battery were produced in each of Example 1 and Comparative Example 1 under the same conditions and the rate characteristics tests were performed regarding each sample of the batteries. In the graph of FIG. 8, symbol "○" represents measurement plots of the batteries of Example 1, while symbol "□" represents measurement plots of the batteries of Comparative Example 1.

TABLE 1

|  |  | Capacity per unit area [mAg/cm$^2$] | | |
|---|---|---|---|---|
|  |  | C/10 | C/5 | C/3 |
| Example 1 | Sample 1 | 3.94 | 3.69 | 3.58 |
|  | Sample 2 | 4.00 | 3.74 | 3.69 |
|  | Sample 3 | 4.01 | 3.77 | 3.70 |
| Comparative Example 1 | Sample 1 | 3.88 | 3.63 | 3.32 |
|  | Sample 2 | 3.86 | 3.58 | 3.26 |
|  | Sample 3 | 3.86 | 3.63 | 3.30 |

As can be seen from the graph of FIG. 8 and Table 1, at each rate of discharging, capacities per unit area of the battery produced in Example 1 were larger than those produced in Comparative Example 1. Namely, it was found that rate characteristics improved compared to the electrodes in which metallic lithium, which is the anode active material, was deposited on a flat and smooth face, by making carbon nanotubes project from the surface of the conductive material layer, so as to render to the surface of conductive material layer a three-dimensional structure and depositing metallic lithium on the carbon nanotubes.

EXPLANATION OF REFERENCE NUMERALS

1 Lithium battery
10 Anode for lithium batteries
11 Structure
12 Deposited layer
13 Carbon nanotube
14 Conductive material layer
14a Surface (of conductive material layer)
15 Metallic lithium
20 Cathode
21 Cathode electrode layer
22 Cathode current collector
30 Separator

What is claimed is:

1. An anode for use in a lithium battery comprising:
a conductive material layer having a flat surface for facing a separator in a lithium battery;
a plurality of randomly-spaced-and-shaped carbon nanotubes anchored in the conductive material layer, wherein each of the randomly-spaced-and-shaped carbon nanotubes comprises a portion protruding from the flat surface of the conductive material layer; and
a layer of metallic lithium placed over the plurality of randomly-spaced-and-shaped carbon nanotubes and the flat surface, wherein the layer of metallic lithium and the plurality of randomly-spaced-and-shaped carbon nanotubes in combination provide a plurality of randomly-spaced-and-shaped protrusions having a randomly-shaped metallic surface of lithium over the flat surface of the conductive material layer,
wherein in a cross-sectional perpendicular to the flat surface, the randomly-shaped metallic surface of lithium provides a randomly-shaped recess between two immediately neighboring ones of the plurality of randomly-spaced-and-shaped carbon nanotubes such that at least part of the metallic lithium deposition to the anode according to charging of the lithium battery is received in the randomly-shaped recess to suppress growth of metallic lithium dendrite toward the separator.

2. The anode according to claim 1, wherein the density of the plurality of randomly-spaced-and-shaped carbon nanotubes protruding from the flat surface of the conductive material layer is 0.1 mg/cm$^2$ to 10 mg/cm$^2$.

3. The anode according to claim 1, wherein the amount of the metallic lithium in the metallic lithium layer placed over the plurality of randomly-spaced-and-shaped carbon nanotubes is 0.01 mg/cm$^2$ to 5 mg/cm$^2$.

4. The anode according to claim 1, wherein the plurality of randomly-spaced-and-shaped carbon nanotubes comprise carbon nanofibers.

5. The anode according to claim 1, wherein the lithium batteries are secondary batteries.

6. A lithium battery comprising:
an anode according to claim 1;
a cathode;
a separator separating between the cathode and the anode; and
an electrolytic solution comprising lithium ions, the lithium ions being able to move across the separator.

* * * * *